(12) United States Patent
Seethaler et al.

(10) Patent No.: US 9,050,872 B2
(45) Date of Patent: Jun. 9, 2015

(54) VEHICLE WHEEL SUSPENSION WITH WHEEL LOAD VARIATION VIA A DEFLECTION LEVER

(71) Applicant: Bayerische Motoren Werke Aktiengesellschaft, Munich (DE)

(72) Inventors: Ludwig Seethaler, Herbertshausen (DE); Hubert Scholz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/197,905

(22) Filed: Mar. 5, 2014

(65) Prior Publication Data

US 2014/0183830 A1    Jul. 3, 2014

Related U.S. Application Data

(63) Continuation of application No. PCT/EP2012/065025, filed on Aug. 1, 2012.

(30) Foreign Application Priority Data

Sep. 5, 2011   (DE) .......................... 10 2011 082 128

(51) Int. Cl.
```
B60G 17/02      (2006.01)
B60G 21/05      (2006.01)
B60G 3/20       (2006.01)
```
(52) U.S. Cl.
CPC .............. B60G 17/02 (2013.01); B60G 21/053 (2013.01); B60G 17/021 (2013.01);
(Continued)

(58) Field of Classification Search
CPC .. B60G 17/015; B60G 17/0157; B60G 17/02; B60G 21/053; B60G 3/202; B60G 2204/421

USPC .......... 280/124.106, 124.107, 124.103, 5.507
See application file for complete search history.

(56) References Cited

U.S. PATENT DOCUMENTS 2,760,785 A * 8/1956 Kolbe .................... 280/124.103
3,767,181 A * 10/1973 Van der Burgt et al. ...... 267/136
(Continued)

FOREIGN PATENT DOCUMENTS

DE    199 23 343 B4    9/2006
EP    0 639 123 B1     8/1997
(Continued)

OTHER PUBLICATIONS

German-language Search Report with partial English translation thereof dated May 8, 2012 {Ten (10) pages}.

(Continued)

*Primary Examiner* — Nicole Verley
(74) *Attorney, Agent, or Firm* — Crowell & Moring LLP

(57) ABSTRACT

A vehicle wheel suspension has a suspension spring, by which the vehicle body is proportionally supported on a supporting bracket of the wheel suspension. The wheel load acting upon a pertaining wheel as a result of this support is changeable in that the transmission ratio at a shift lever provided in the load path of the support and swivelably disposed at the vehicle body with respect to the latter can be changed by an actuator. Parallel to the load path containing the shift lever and a first suspension spring element, an additional load path with a second suspension spring element effective between the vehicle body and the pertaining wheel is provided. The transmission ratio at the shift lever may be changed over a wide range by displacement of the supporting point of the first suspension spring element or a transmission rod supported with its other end at the supporting bracket of the wheel suspension. This supporting point may be displaced closely into the surroundings of the bearing point of the shift lever at the vehicle body or axle carrier.

12 Claims, 3 Drawing Sheets

(52) U.S. Cl.
CPC ........ *B60G 2200/44* (2013.01); *B60G 2202/42* (2013.01); *B60G 2204/127* (2013.01); *B60G 2204/421* (2013.01); B60G 3/20 (2013.01)

(56) References Cited

U.S. PATENT DOCUMENTS

| | | | | |
|---|---|---|---|---|
| 4,632,413 | A * | 12/1986 | Fujita et al. | 280/124.103 |
| 6,793,228 | B2 * | 9/2004 | Zadok | 280/124.134 |
| 7,594,670 | B2 * | 9/2009 | Dundon | 280/124.152 |
| 8,296,009 | B2 * | 10/2012 | Kajino | 701/38 |
| 8,317,208 | B2 * | 11/2012 | Bird | 280/124.107 |
| 8,398,092 | B2 * | 3/2013 | Lee et al. | 280/5.507 |
| 8,408,559 | B1 * | 4/2013 | Lee et al. | 280/5.508 |
| 8,579,313 | B2 * | 11/2013 | Lee et al. | 280/124.152 |
| 8,608,186 | B2 * | 12/2013 | Lee et al. | 280/124.106 |
| 2003/0116935 | A1 * | 6/2003 | Zadok | 280/124.106 |
| 2005/0087946 | A1 * | 4/2005 | Carlstedt et al. | 280/124.106 |
| 2009/0288297 | A1 * | 11/2009 | Schmidt et al. | 29/898.052 |
| 2012/0049480 | A1 * | 3/2012 | Lee et al. | 280/124.106 |
| 2012/0292871 | A1 * | 11/2012 | Wittmann et al. | 280/124.106 |
| 2012/0306177 | A1 * | 12/2012 | Thill | 280/124.152 |

FOREIGN PATENT DOCUMENTS

| | | |
|---|---|---|
| EP | 1 750 956 B1 | 2/2008 |
| FR | 2 730 956 A1 | 8/1996 |
| WO | WO 2005/105489 A1 | 11/2005 |

OTHER PUBLICATIONS

International Search Report (PCT/ISA/210) with English translation thereof dated Oct. 19, 2012 {Five (5) pages}.

* cited by examiner

VEHICLE WHEEL SUSPENSION WITH WHEEL LOAD VARIATION VIA A DEFLECTION LEVER

CROSS REFERENCE TO RELATED APPLICATIONS

This application is a continuation of PCT International Application No. PCT/EP2012/065025, filed Aug. 1, 2012, which claims priority under 35 U.S.C. §119 from German Patent Application No. 10 2011 082 128.7, filed Sep. 5, 2011, the entire disclosures of which are herein expressly incorporated by reference.

BACKGROUND AND SUMMARY OF THE INVENTION

The invention relates to a vehicle wheel suspension having a suspension spring, by means of which the vehicle body is proportionally supported on a supporting bracket of the wheel suspension. The wheel load acting upon the pertaining wheel as a result of this support is changeable in that the transmission ratio at a shift lever provided in the load path of the support and swivelably disposed at the vehicle body, or an axle carrier with respect to the latter can be changed by way of an actuator. Concerning the state of the art, reference is made particularly to DE 199 23 343 B4, in addition to EP 1 750 956 B1.

In DE 199 23 343 B4, an advantageous measure is described for a variable adjustment of the distance between the vehicle body and the wheel center of the wheel guided by way of the wheel suspension. Accordingly, a shifting between the wheel lift and the lift of the damping member and/or suspension member of the wheel suspension by way of a shift lever swivelably disposed at the vehicle body ("vehicle-body-side") is provided, in which case, by way of a position change of this shift lever about its swiveling axis, the variable adjustment of the above-mentioned distance can be caused. For the adjustability of the ratio between the shift lever and the damping member and/or suspension member, an intermediate part is provided which, in turn, can be swiveled by way of an actuator. This intermediate part alone already contributes to the fact that this known arrangement requires relatively high expenditures.

In the EP 1 750 956 B1, a similar measure is described for changing the so-called reaction characteristics of the suspension spring/shock absorber assembly, in which case, instead of the shift lever mentioned above, a cranking mechanism is provided. This arrangement has the advantage that the operating direction of the actuator provided for changing the transmission ratio in the above-mentioned cranking device extends approximately perpendicular to the direction of the force effect of the suspension spring/shock absorber assembly, so that the force to be applied by this actuator for changing the transmission ratio is relatively low. However, on the one hand, this cranking mechanism also requires relatively high expenditures and, on the other hand, like the shift lever arrangement mentioned above, has to be designed for absorbing high forces, specifically the wheel load (vertical wheel force) maximally possible at the respective wheel suspension. This requires a relatively massive, and therefore high-expenditure, and heavy construction, which is definitely a disadvantage.

It is an object of the present invention to provide a remedial measure for the above-described problems.

This and other objects are achieved by a vehicle wheel suspension having a suspension spring, by which the vehicle body is proportionally supported on a supporting bracket of the wheel suspension, wherein the wheel load acting upon the pertaining wheel as a result of the support is changeable in that the transmission ratio at a shift lever provided in the load path of the support and swivelably disposed at the vehicle body or an axle carrier with respect to the latter, can be changed by way of an actuator. Parallel to the load path containing the shift lever and a first suspension spring element, an additional load path with a second suspension spring element effective between the vehicle body and the pertaining wheel is provided at this individual wheel suspension.

According to the invention, only a portion of the vertical wheel force or wheel load present at the respective wheel is guided by way of the device permitting a changeable transmission ratio, which device, because of the simple construction, in the present case, as basically known, is designed in the form of a shift lever. In this case, it should be explicitly pointed out the term "shift lever" is to be understood in an abstract sense. This term therefore includes any device by way of which the line of influence of a force path or load path can be shifted and, at which, as a necessary characteristic, the transmission ratio (of this shift lever) can be changed. For the fraction of the wheel load not guided by way of such a shift lever, a further load path is provided according to the invention, in which a suspension spring element is provided, just as it is in the load path guided by way of the shift lever. Accordingly, (at least) two suspension spring elements connected parallel to one another are provided at a wheel suspension according to the invention. This has the effect that the forces to be transmitted, which are present in the respective load path and particularly in the load path containing shift lever, are thereby reduced. However, since the forces are reduced with respect to their amount, a lighter and simpler shaping of the load path containing the shift lever also becomes possible.

When the first suspension spring element acting upon the shift lever is an approximately horizontally aligned coil spring, the latter can be arranged in an installation space that is still somewhat vacant, preferably in the transverse direction of the vehicle in conventional two-track motor vehicles, particularly passenger cars. It may then also be particularly advantageous to support with respect to one another the load paths of the left-side and right-side vehicle wheel suspension, which are guided by way of the respective shift lever. For such an arrangement, a shock absorber, which is supported at the vehicle body or at the axle carrier and has a conventional construction, can then be provided more easily than in the case of the usual stabilizers in the mutually supported load path, whereby a simple damping of rolling motions of the vehicle body will then also easily become possible. This shock absorber is preferably tuned to the intrinsic rolling frequency of the vehicle body.

In this context, it should be pointed out that, by means of a wheel suspension according to the invention with a changeable wheel load in the case of two-track vehicles, the actuators influencing the respective wheel load, for swiveling the shift levers on an axle curing a cornering of the vehicle, can be controlled such that the roll angle of the vehicle body will be limited. As a result, a (transverse) stabilizer, which is otherwise provided at this axle, can be eliminated, and an arrangement according to the invention can take up its installation space.

When a vibration absorber for damping the rolling motion is provided in the mutual support implemented, for example, by way of a suitable rod, which vibration absorber acts upon this rod, for example, suitable stops may be provided which limit the displacement path of the above-mentioned rod in order not to excessively impair the above-mentioned possibility of the roll angle reduction by the suitable control of the actuator or actuators. However, naturally, a vibration absorber may also be provided in the respective load path, in addition to the suspension spring element, without such a mutual support of the load paths of the left and right vehicle side containing the shift lever. This permits not only the desired influencing of the wheel load and thereby also a leveling control of the vehicle body, but higher wheel-related shock absorber forces can also be achieved when the load capacity in the vehicle is changed, so that also a load-dependent vibration damping is provided.

In this context, the basic advantages of a wheel suspension having the characteristics set forth above should briefly be mentioned. Nowadays, particularly superclass vehicles are still using complex systems for desirably influencing the wheel load. These are a pneumatic shock absorption for the leveling, an active roll stabilization for reducing the roll angle and, in top models, full-load-bearing active chassis up to the coupling with stereo cameras in order to be able to react to obstacles in an anticipatory fashion and to correspondingly adapt the wheel load. The necessary infrastructure for such systems has considerable negative effects on the vehicle package, its weight and manufacturing costs, and is connected with considerable power consumption. This, in turn, has a negative effect on the fuel consumption and the exhaust emissions of the vehicle. The control energy required for these customary systems for influencing the wheel load is high, because the respective actuators act in the direction of the load path in the case of the active roll stabilization as well as in the case of a full-load-bearing active chassis, and the adjusting forces are therefore at the level of the stationary wheel load. In the case of the pneumatic shock absorption, the expenditures for the compressor, the air dryer and the pressure accumulator result in unfavorable expenditures.

In contrast, a wheel suspension according to the invention can be designed to be considerably more advantageous, specifically when the operating direction of the actuator, when changing the transmission ratio with the effective force direction of the first suspension spring element provided in the load path containing the shift lever, encloses an angle on the order of from 70° to 110°. Specifically, when the adjusting direction of the actuator is not selected in the direction of the load path but perpendicularly thereto, the actuator, with the exception of friction effects, has to carry out virtually no adjusting work.

A further advantageous development of a wheel suspension according to the invention is characterized in that the transmission ratio at the shift lever can be changed over a wide range by the displacement of the supporting point of the first suspension spring element or a transmission rod supported with its other end at a supporting bracket of the wheel suspension, in that this supporting point can be displaced closely into the surroundings of the bearing point of the shift lever at the vehicle body or axle carrier. Specifically, when the above-mentioned load path with the corresponding positioning of the above-mentioned supporting point were to extend precisely through the above-mentioned bearing point of the shift lever, a transmission ratio of "zero" would be obtained, and the wheel suspension would not be influenced by way of this load path. When, in contrast, the above-mentioned supporting point is moved far away from the bearing point of the shift lever, it can definitely be shown that the support of the wheel load is taken on for the most part by the first suspension spring element and less by the second suspension spring element, which is provided in the other load path that does not contain the shift lever. Between these two extreme positions, virtually any intermediate position is possible, particularly when the above-mentioned supporting point of the first suspension spring element or of the transmission rod can be displaced along a guiding link, and the actuator is provided with a suitable transmission for displacing the supporting point next to this guiding link. Utilizing these possibilities to a maximum, the above-mentioned supporting point may even be displaceable such that the load path can extend by way of the shift lever at both sides of the bearing point of the shift lever at the vehicle body or axle carrier. As a result, a quasi-negative transmission ratio can be adjusted at the shift lever and, as a function of the layout of the suspension spring elements, in the extreme case, the respective wheel can be completely relieved or even be minimally lifted off the ground. For example, in the case of a flat tire, a tire could particularly easily be changed without the aid of a jack. Likewise, in connection with a so-called preview function (for example, by use of a stereo camera), it is contemplated that the respective wheel load is reduced in a targeted manner before driving over a recognized obstacle.

The actuator may be constructed as an electric motor with a self-locking threaded spindle on an output side, whereby undesirable changes of the transmission ratio at the shift lever, for example, under the effect of environmentally caused wheel load fluctuations, can be excluded. In addition, if a wheel suspension according to the invention is provided at a steerable wheel, it is advantageous for the force effect line of the above-mentioned transmission rod between a supporting bracket of the wheel suspension and the shift lever to at least approximately intersect with the steering axle of the steerable wheel. It can thereby practically be excluded that a desired change of the wheel load caused at the shift lever by a change of the transmission ratio will cause a (slight) steering movement of the wheel.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
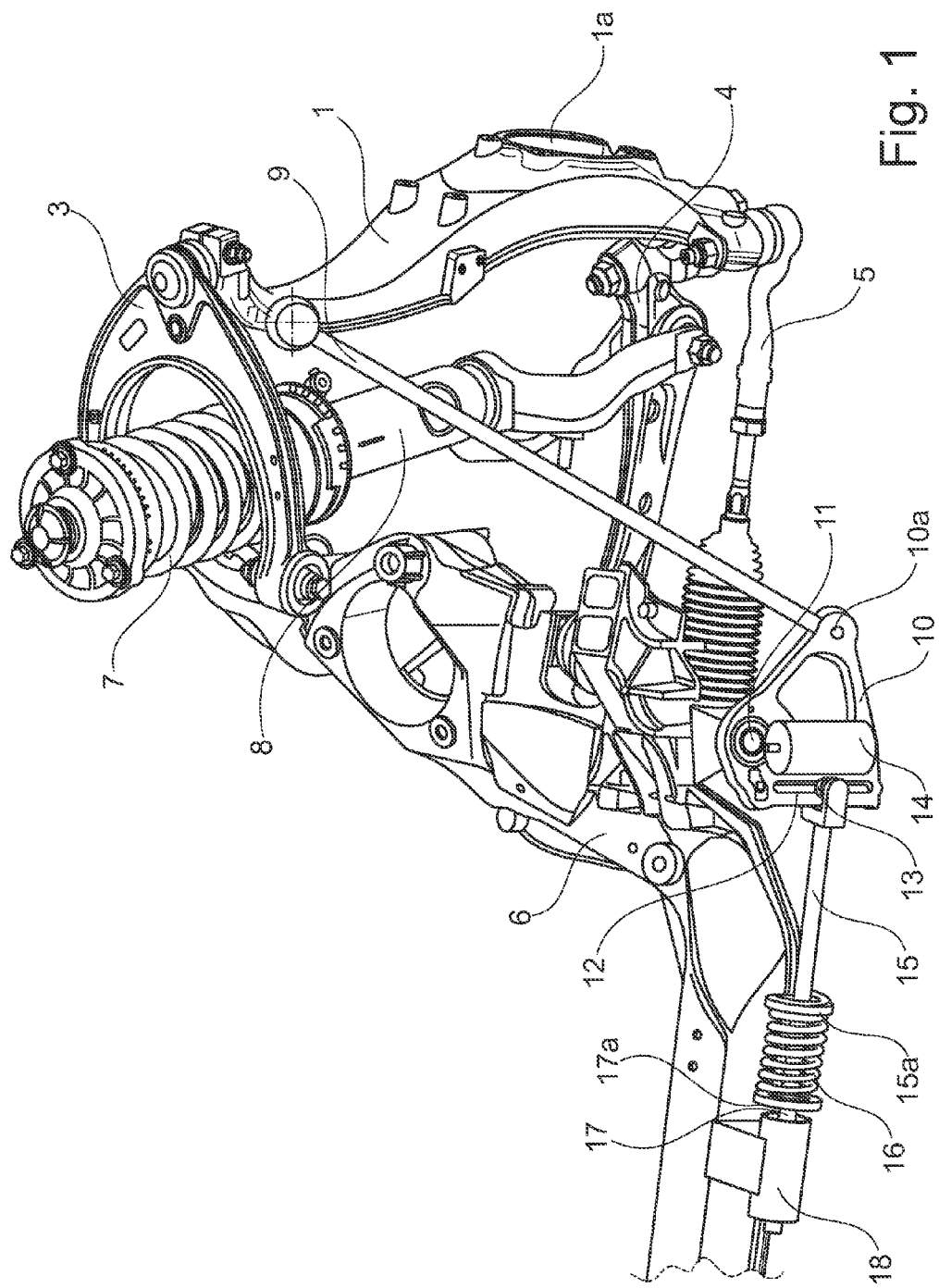
FIG. 1 is a perspective view from the exterior of the left-side front wheel suspension of a passenger car.

The reference number 1 marks the wheel carrier of a front axle of a passenger car, which is constructed here as a twin control arm front axle, at which, in the area 1*a*, a receiving flange is provided for a wheel (not shown). The wheel is rotatably disposed on the receiving flange. In a conventional manner, the wheel carrier 1 is guided by an upper A-arm 3 and two lower arms, of which only one transverse arm 4 is illustrated for reasons of clarity, as well as by a tie rod 5. Reference number 6 marks an axle carrier, to which, as illustrated, the transverse arm 4 is linked, among others. A suspension spring element 7 designed as a coil pressure spring, together with a pertaining vibration shock absorber element 8, is supported at the lower transverse arm 4. The vehicle body, which is only represented by dashed lines 30, is proportionally, i.e. with that part assigned to the left front wheel, supported at the upper end of the here so-called spring-and-damper strut formed by the suspension spring element 7 and the shock absorber element 8.

A transmission rod 9 is linked, in the manner of a link support, to the upper end area of the wheel carrier 1, the upper end of the transmission rod 9 being connected in a correspondingly articulated fashion with a shift lever 10 at a linking point 10a. In this case, this shift lever 10 can be swiveled by way of a bearing point 11 at the axle carrier 6 about an axis extending approximately in the direction of the longitudinal vehicle axis. A guiding link 12, extending here essentially in the vertical direction, is provided in this shift lever 10, in which guiding link 12 a displaceable supporting element 13 is displaceably guided by way of an actuator 14. A supporting rod 15, extending approximately horizontally in the transverse direction of the vehicle and having a spring plate 15a, is fastened to the supporting element 13. A suspension spring element 16, designed here as a coil tension spring is fastened with one of its two ends to the spring plate 15a. At its other end, the suspension spring element 16 is supported on or fastened to a spring plate 17a of a central supporting rod 17, which is guided through a vibration shock absorber 18. The vibration shock absorber 18 has a damping effect on the central supporting rod 17 or its displacing movements in the longitudinal rod direction. On the other side of this vibration shock absorber 18, which side is not shown in the figure, the same elements are arranged mirror-symmetrically, so that the transmission rod 9 of the left front wheel of the vehicle illustrated in the figures is supported on the corresponding transmission rod of the right front wheel of the vehicle that is also not shown. The suspension spring element 16 and its corresponding counterpart of the right-side wheel suspension are inserted into this mutual support.

As illustrated, the proportional support of the vehicle body at the wheel suspension illustrated in the figures therefore takes place by way of two load paths. A first load path is represented by the transmission rod 9, which originates from the wheel carrier 1, with the adjoining shift lever 10 and the suspension spring element 16 (called a first suspension spring element (16) in the following), in which case, the supporting bracket of the wheel suspension mentioned at the outset (Background and Summary section) is here formed by the wheel carrier 1. The second load path parallel to this first load path is represented by the suspension spring element 7 (in the following called the second suspension spring element (7)).

Figure 2:
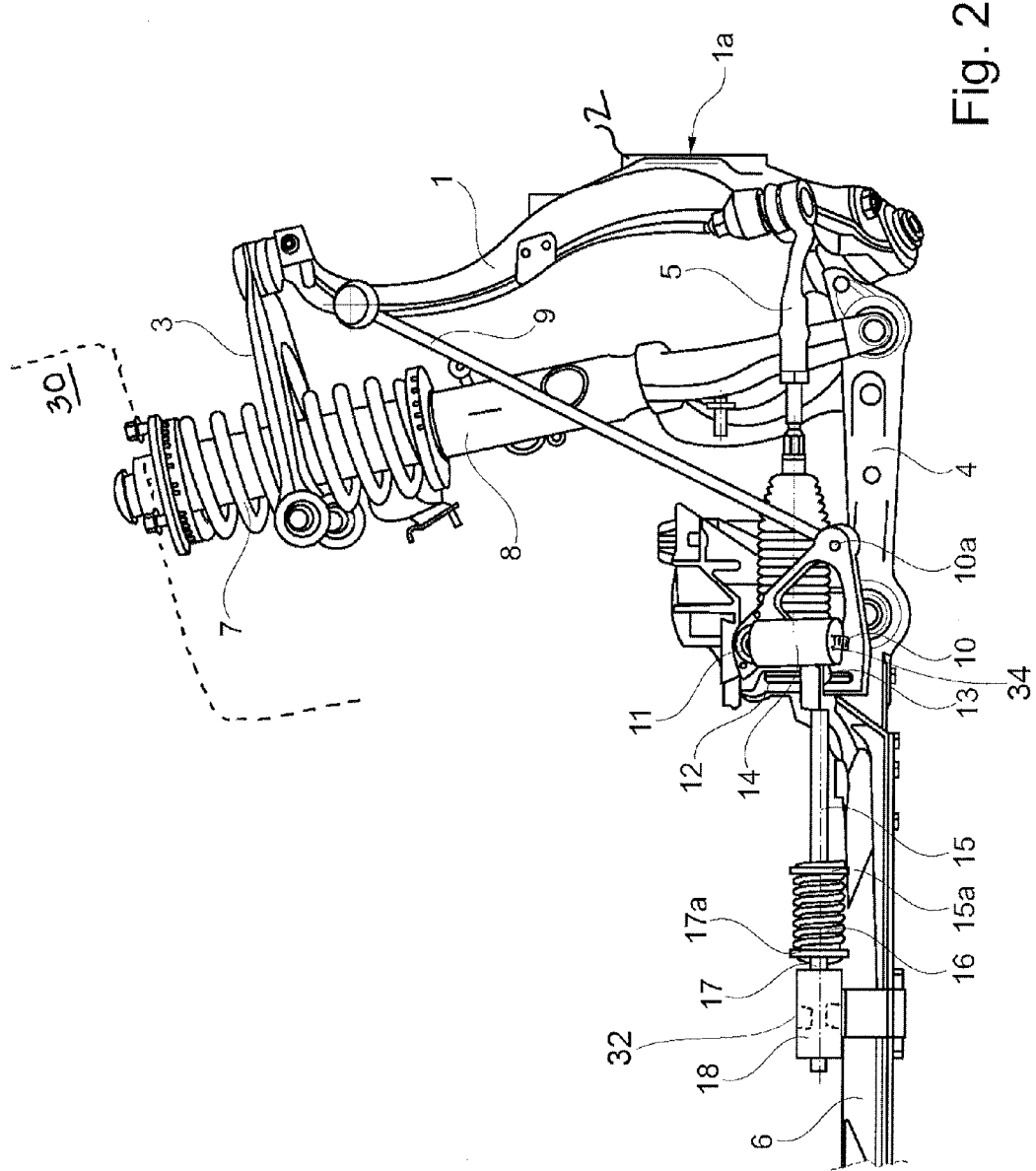
FIG. 2 is a corresponding view from the front.
Figure 3:
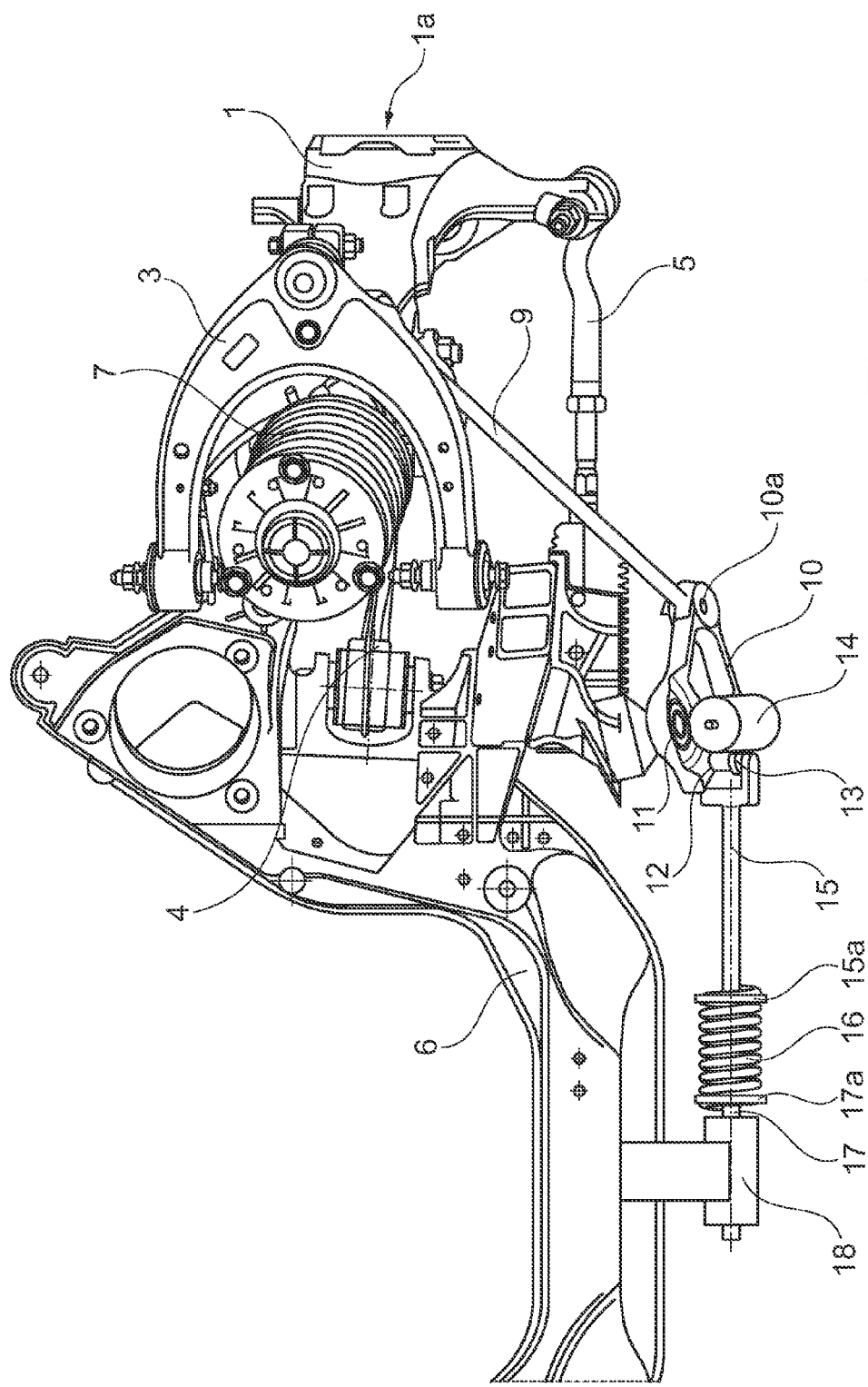
FIG. 3 is a corresponding view from the top.

When the supporting element 13 forming the first suspension spring element 16 is displaced in the first load path by way of the actuator 14, the so-called wheel load, which under otherwise unchanged marginal conditions acts upon the wheel or the wheel receiving flange 2, will necessarily change, by which wheel load, the wheel is supported on the road, with all known advantages and effects connected therewith. By way of a design of the shift lever 10 according to FIGS. 1-3, the transmission ratio of this shift lever 10 can be varied only in the value range of greater than zero to "1". If, in the figures, the guiding link 12 in the shift lever 10 were lengthened upwards beyond the bearing point 11, i.e. past the latter (still farther away from the road in the upward direction), even a negative transmission ratio on the order of, for example, approximately "−0.5" could even be represented. In that specifically the actuator 14, as illustrated, is arranged next to the guiding link 12 and, for this purpose, is designed, for example, as an electric motor with a threaded spindle 34 drive on the output side, by way of this actuator 14 and the suitable guiding link 12, the supporting element 13 can be positioned such that the load path in the shift lever 10 will extend from the linking point 10a of the transmission rod 9, not only through the bearing point 11 of the shift lever 10 to the supporting element 13, but the supporting element 13 can also be positioned in the guiding link 12 such that this above-mentioned load path can extend on both sides of the above-mentioned bearing point 11 of the shift lever 10.

A further advantage of the wheel suspension illustrated in the figures, specifically that the working direction of the actuator 14 extending in the longitudinal direction of the guiding link 12, when the transmission ratio is changed, with the effective force direction of the first suspension spring element 16 provided in the load path containing the shift lever 10, which extends along the supporting rod 15, encloses an angle on the order of from 70° to 110°, was already explained at the outset. The present arrangement for changing the wheel load by changing the transmission ratio in the first load path is further distinguished by an extremely simple construction with few components. Furthermore, it is pointed out that, although in the present case the first suspension spring element 16 is constructed as a tension spring, with a different arrangement of the shift lever 10 and/or its bearing point 11, a pressure spring can also be used. If, in this case, a pressure spring is used that has a progressive (non-linear) characteristic spring curve, the adjusting path to be applied by the actuator 14 can be minimized.

Naturally, numerous details, particularly of the constructive type, may be varied from the above explanations and figures within the content of the invention. For example, the first suspension spring element 16 in the first load path can be supported with or without the insertion of a shock absorber element directly at the vehicle body or at the axle carrier 6. When, however, as in the case of the present construction, the supporting takes place in the first load path with respect to the other vehicle side, the providing of a preferably linear damping mechanism, as in this case, by way of the vibration shock absorber 18, which may be designed similarly to a hydraulic steering shock absorber, is particularly advantageous. This shock absorber 18 acts during a reciprocal compression left/right and thereby dampens the rolling motion of the vehicle body; in contrast, the vibration shock absorber 18 will remain idle for a compression in the same direction left/right and will develop no damping force. An additional independent tuning parameter is therefore available, the conceivable shock absorber path preferably being limited by suitably provided stops (for example, stops 32 shown in dashed lines within the housing of the vibration shock absorber 18).

In this case, the installation space of an active rolling stabilization system at a twin control arm front axle, which is no longer required here but is provided without the present first load path, is utilized in order to accommodate this first load path. The conventional spring-and-damper strut in the form of the second suspension spring element 7 with the pertaining vibration shock absorber element 8 is maintained, and the wheel load is supported in approximately equal parts in the construction position by the spring-and-damper strut or the second suspension spring element 7 and the first suspension spring element 16. The force level of the participating components is therefore clearly low. When then the supporting element and thereby the supporting point of the supporting rod 15 are displaced by way of the actuator 14, the transmission of the shift lever 10 will change and thereby also the transmission ratio of the first suspension spring element 16 relative to the wheel contact point. The result is a compression or rebound movement of the vehicle body with respect to the wheel or with respect to the wheel carrier 1. When the actuator 14 moves back into the starting position, the vehicle body will spring back into the construction position. This effect can be utilized in the same direction on the left and the right vehicle side, in order to change the ride height of the vehicle body, for example, for entering/exiting the vehicle, as a loading balance or for lowering a high speed, or in the opposite sense, for reducing the roll angle when the vehicle is cornering. In connection with a camera, an anticipatory influencing of the wheel load is also contemplated in the case of obstacles. Similar to a pneumatic shock absorption, the vibration frequency also remains approximately constant with an increasing wheel load, thus when loading. On the whole, an arrangement is introduced that is optimized with respect to the installation space requirement, for influencing the wheel load with the possibility of a ride height adjustment, for reducing the roll angle, for reducing the roll angle speed, and in connection with a camera for optimizing the wheel load when driving over an obstacle. This arrangement is advantageously distinguished by a minimal energy demand because—as explained above—the actuator 14 practically has to overcome only friction forces during the adjustment of the supporting element 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle wheel suspension, comprising:
   a wheel carrier of the wheel suspension;
   a first suspension spring arranged in a load path by which a vehicle body is proportionally supported on the wheel carrier;
   a shift lever provided in the load path, the shift lever being swivelably disposed at the vehicle body or an axial carrier with respect to the vehicle body;
   an actuator configured to change a transmission ratio at the shift lever, wherein a wheel load acting upon a pertaining wheel via the load path is changeable by changing the transmission ratio; and
   a second suspension spring configured as part of an additional load path effective between the vehicle body and the pertaining wheel.

2. The vehicle wheel suspension according to claim 1, wherein the first suspension spring acting upon the shift lever is an approximately horizontally aligned coil spring.

3. The vehicle wheel suspension according to claim 1, wherein the actuator, when changing the transmission ratio with an effective force direction of the first suspension spring, encloses an angle on an order of 70 degrees to 110 degrees.

4. The vehicle wheel suspension according to claim 1, wherein
   the transmission ratio at the shift lever is changeable over a broad range by displacement of a supporting point of the first suspension spring or a transmission rod supported at another end at the wheel carrier, and
   the supporting point being displaceable closely into surroundings of a bearing point of the shift lever at the vehicle body or axle carrier.

5. The vehicle wheel suspension according to claim 4, wherein
   the supporting point of the first suspension spring or of the transmission rod is displaceable along a guiding link, and
   the actuator has a transmission for displacing the supporting point next to the guiding link.

6. The vehicle wheel suspension according to claim 4, wherein the supporting point is displaceable such that the load path extends via the shift lever at both sides of the bearing point at the vehicle body or axle carrier.

7. The vehicle wheel suspension according to claim 5, wherein the supporting point is displaceable such that the load path extends via the shift lever at both sides of the bearing point at the vehicle body or axle carrier.

8. The vehicle wheel suspension according to claim 1, wherein
   the vehicle wheel suspension is for a two-track vehicle, and
   load paths of a left-side and a right-side vehicle wheel suspension guided by way of respective shift levers are supported with respect to one another.

9. The vehicle wheel suspension according to claim 8, wherein
   in a mutually supported load path, a shock absorber is provided, the shock absorber being supported on the vehicle body or axle carrier.

10. The vehicle wheel suspension according to claim 9, wherein the shock absorber comprises stops limiting a path of the shock absorber.

11. The vehicle wheel suspension according to claim 1, wherein the actuator is an electric motor having a self-locking threaded spindle on an output side thereof.

12. The vehicle wheel suspension according to claim 1, wherein a force effect line of the transmission rod at least approximately intersects a steering angle of a steerable wheel.

* * * * *